(12) United States Patent
Dai et al.

(10) Patent No.: US 9,061,400 B1
(45) Date of Patent: Jun. 23, 2015

(54) MAGNETIC FIXTURE

(75) Inventors: Xiangyang Dai, East Amherst, NY (US);
Robert Miller, Lancaster, NY (US);
Gregory A. Voss, Alden, NY (US)

(73) Assignee: Greatbatch Ltd., Clarence, NY (US)

( * ) Notice: Subject to any disclaimer, the term of this patent is extended or adjusted under 35 U.S.C. 154(b) by 0 days.

(21) Appl. No.: 13/423,355

(22) Filed: Mar. 19, 2012

Related U.S. Application Data

(60) Provisional application No. 61/454,001, filed on Mar. 18, 2011.

(51) Int. Cl.
*B25B 11/00* (2006.01)
*B23Q 3/154* (2006.01)
*H01F 7/02* (2006.01)

(52) U.S. Cl.
CPC ............ *B25B 11/002* (2013.01); *B23Q 3/1543* (2013.01); *H01F 7/0252* (2013.01); *B23Q 3/1546* (2013.01)

(58) Field of Classification Search
CPC .... B25B 11/002; B23Q 3/154; B23Q 3/1546; H01F 7/0252

USPC ........................................ 335/285–295; 269/8
See application file for complete search history.

(56) References Cited

U.S. PATENT DOCUMENTS

| | | | | |
|---|---|---|---|---|
| 5,828,224 A | * | 10/1998 | Maruyama | ............... 324/756.02 |
| 5,926,362 A | | 7/1999 | Muffoletto et al. | |
| 5,992,005 A | * | 11/1999 | Roessler et al. | ................. 29/606 |
| 6,613,474 B2 | | 9/2003 | Frustaci et al. | |
| 6,623,887 B2 | | 9/2003 | Gan et al. | |
| 7,611,805 B2 | | 11/2009 | Frustaci et al. | |
| 7,813,107 B1 | | 10/2010 | Druding et al. | |

* cited by examiner

*Primary Examiner* — Ramon Barrera
(74) *Attorney, Agent, or Firm* — Steven W. Winn

(57) ABSTRACT

A fixture in which an attractive magnetic force is utilized to join two parts of a container or housing together is discussed. The fixture comprises a fixture body portion, a fixture base portion and a removable fixture plate portion. At least one body magnet resides within the fixture body portion and at least one plate magnet resides within the removable fixture plate. The fixture body and plate magnets are positioned such that when they are brought together, an attractive magnetic force pulls the plate towards the fixture body. Therefore, when the respective housing portions are positioned within the fixture, the magnetic force compresses the housing portions together.

35 Claims, 8 Drawing Sheets

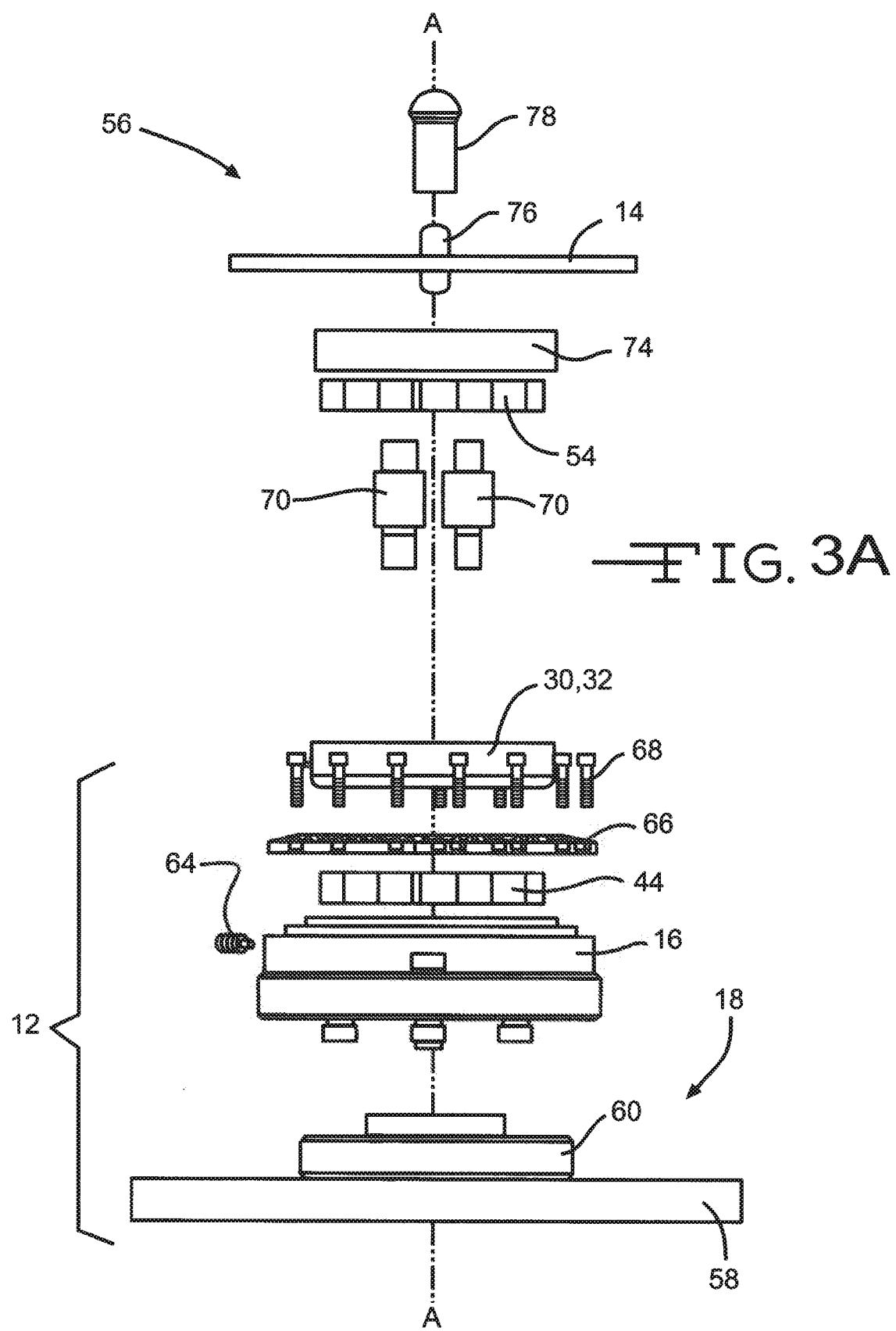

MAGNETIC FIXTURE

CROSS-REFERENCE TO RELATED APPLICATIONS

This application claims priority from U.S. Provisional Patent Application Ser. No. 61/454,001, filed Mar. 18, 2011.

BACKGROUND OF THE INVENTION

1. Field of the Invention

The present invention relates generally to a fixture designed to hold components together during a joining process. More particularly, the present invention relates to a magnetic fixture designed to hold the components of a housing enclosure of an electrochemical device or a medical device together during a joining process. In its broadest sense, however, the housing is a container comprising first and second parts that are joined together to form a closed container.

2. Description of Related Art

The sophistication and complexity of implantable medical devices continues to increase. As a result, these devices typically require additional electrical power to operate. In addition to the increased sophistication and complex capability, the size of these implantable medical devices is becoming increasingly smaller. Therefore, there is an increased need to manufacture electrochemical devices of increasing power and capability in a smaller volume in which to fit within and power these more compact and sophisticated medical devices.

Increasing the packaging efficiency is one approach to achieve improved electrical performance of electrochemical devices, such as electrochemical cells and capacitors, which power implantable medical devices. Improved electrical performance characteristics, such as energy density, electrical longevity, and electrical output of an electrochemical device can typically be improved through the maximized utilization of the interior space of the housing or enclosure of the electrochemical device. A more compact electrochemical device affords the ability to construct and power smaller medical devices which are less invasive to the patient without sacrificing therapeutic capability.

Electrochemical devices such as those used to power implantable medical devices, are typically constructed with a metallic housing comprised of two opposing case halves. During the manufacturing process, the active electrode materials, as well as other electrochemical device related components, are generally positioned within one half of the housing. A second housing portion, such as a corresponding enclosure half or enclosure lid, is mated to the first housing portion, thereby enclosing the electrochemical device therewithin. A weld is generally used to join these housing portions together. More specifically, a weld seam, extending circumferentially around the mating surfaces of the device, is used to create a hermetic seal therewithin. The integrity and robustness of this hermetic seal is of utmost importance in that the seal prevents the egress of body fluids within the cell and chemicals out of the cell. Migration of these fluids and chemicals could potentially harm the patient and/or damage the medical device within which the cell resides.

Because of the relatively compact size of these electrochemical devices, mating of the two opposing portions of the device housing requires exacting precision. Often, the opposing halves of the housing are manufactured to close dimensional tolerances, which increases the difficulty of joining the opposing sides of the housing. Therefore, there is a need to provide an improved means of joining the opposing housing portions of an electrochemical device together with improved precision. This is particularly critical in achieving an electrochemical device with a robust hermetic seal.

Furthermore, implantable medical devices, such as pacemakers, neurostimulators, defibrillators and the like, also generally comprise opposing housing portions. The joining of the housing portions of an implantable medical device, like the joining of the housing of an electrochemical device, as previously discussed, is also subject to similar manufacturing problems. Like the electrochemical device, the housing of the implantable medical device generally comprises two opposing metallic housing portions. The housing portions of the implantable medical device are also made to exacting dimensional tolerances, which increases the difficulty of precisely joining them together. Implantable medical devices are also being made to smaller dimensional sizes, therefore adding to the difficulty of joining the housing portions together.

Traditional welding fixtures generally comprise a mechanical restraint such as a clamp, strap, or the like that provides a mechanical means of holding the opposing fixture components together during the joining or welding process. The mechanical restraint of these prior art fixtures physically extends across the space between the left and right hand fixture components holding them together.

The housing portions, that are to be joined, are generally positioned within each of the respective left and right hand fixture components. The mechanical restraint is then positioned across the two fixture portions, securing the fixture together. However, the mechanical restraint, i.e., the clamp, strap or strut that physically extends across the space between the opposing fixture sides generally obstructs the line of sight of the joining or welding instrument. This obstruction is particularly problematic during a laser welding operation in which a laser beam is projected onto the joining surfaces. Such a fixture clamp could prevent the laser beam from contacting the surface behind the clamp, possibly resulting in a non-joined or partially joined portion.

In addition, fixture clamps further increase the difficulty of joining opposing housing portions wherein the welded pieces are rotated with respect to the laser beam. Furthermore, such obstructions inhibit the formation of a robust, hermetic seal that is formed completely around the perimeter of the housing of the device, whether the device is an electrochemical device or an implantable medical device.

As a result, elaborate fixtures have been developed to minimize blockage of the application of the laser welding beam to the weld surface. For example, fixtures have been developed which incorporate movable struts that are electronically controlled. When the laser beam approaches the clamp or strut, these struts are designed to move out of the way of the laser beam, thereby removing the obstruction. These fixtures require additional electronic components to coordinate such movement of the clamp or strut. In addition, these fixtures comprising movable components are prone to mechanical wear, alignment and timing issues, which increases manufacturing costs.

Furthermore, the relatively small size of the housing portions of these electrochemical and medical devices increases the difficulty with which to utilize these prior art welding fixtures. The relatively small size of these devices therefore, requires correspondingly small fixture components and subassemblies with intricate moving parts. Therefore, there is a need to provide an improved welding fixture that does not require the use of mechanical clamps to hold opposing portions of the fixture together during the welding process.

In addition, the increased packing efficiency and relatively small size of the device housing makes these electrochemical and medical devices prone to overheating during the welding process. Heat generated from the welding process, particularly heat generated from a laser beam, could transfer from the weld seam into the bulk of the device, thereby potentially damaging the chemicals or circuitry within the devices. For example, such heat provided by the welding process could warp the housing or damage the active electrochemical materials or associated device components. Therefore, there is a need to provide an improved means and apparatus thereof that minimizes heating during the joining of the housing of the electrochemical or medical device, particularly during a laser welding process.

Accordingly, the present invention provides an improved welding fixture that does not require the use of mechanical clamping. In addition, the fixture of the present invention provides for the precise mating of opposing housing or enclosure portions. Furthermore, the fixture of the present invention provides a heat sink that effectively diverts heat flow away from the weld area and components of the device therewithin.

SUMMARY OF THE INVENTION

The present invention provides a fixture and a method of use thereof to be utilized during a joining process such as welding. Specifically, the fixture of the present invention comprises opposing fixture components that utilize attractive magnetic field forces to join them together. More specifically, the fixture of the present invention comprises at least one magnet or magnetizable material positioned within the thickness of each of the opposing fixture components. These magnets or magnetizable materials are positioned such that their respective magnetic poles are aligned such that they oppose each other, thereby creating an attractive magnetic field force of sufficient strength that brings the fixture components together. Therefore, components positioned within the respective halves of the joining fixture, such as a housing enclosure, are also brought together during the joining process.

Alternatively, at least one electro-magnet may be incorporated within the thickness of each of the opposing fixture components. In either embodiment, a magnetic field of opposing polarity and of sufficient strength is created. The magnetic field is capable of temporarily holding the fixture components together during a joining procedure.

The fixture of the present invention is designed such that the portions to be joined, i.e., a first housing portion and a second housing portion of an electrochemical device or a medical device, positioned within the welding fixture, are not required to be constructed from magnetic materials. The magnetic field force provided by the fixture is designed to temporarily hold the first and second joining portions precisely together without the use of additional clamps, struts or straps.

The fixture of the present invention preferably comprises two opposing fixture portions. Each fixture portion is designed to conform to the dimensions of the respective joined portions, therefore the shape of the respective fixture portions is non-limiting. Once the welding process is complete, the fixture portions are pulled apart and the completed welded piece is removed from the fixture.

In addition, a heat sink comprising a material with heat conductive properties may be incorporated with the fixture of the present invention. The heat sink is designed to divert heat away from the surface of the welded piece and away from the bulk of the device. The heat sink may be incorporated within one or both of the opposing fixture portions. Alternatively, either of the fixture portions may be constructed of a heat conductive material that acts as a heat sink during the welding process.

BRIEF DESCRIPTION OF THE DRAWINGS

FIGS. 2-25 illustrate cross-sectional views of alternate embodiments of fixture plates.

FIG. 3 shows a perspective view of an alternate embodiment of the welding fixture of the present invention.

FIG. 3A illustrates a side view of the alternate embodiment of the welding fixture shown in FIG. 3.

FIGS. 4-4C illustrate magnified cross-sectional views of alternate fixture body portions of the present invention.

DETAILED DESCRIPTION OF THE PREFERRED EMBODIMENTS

Figure 1:
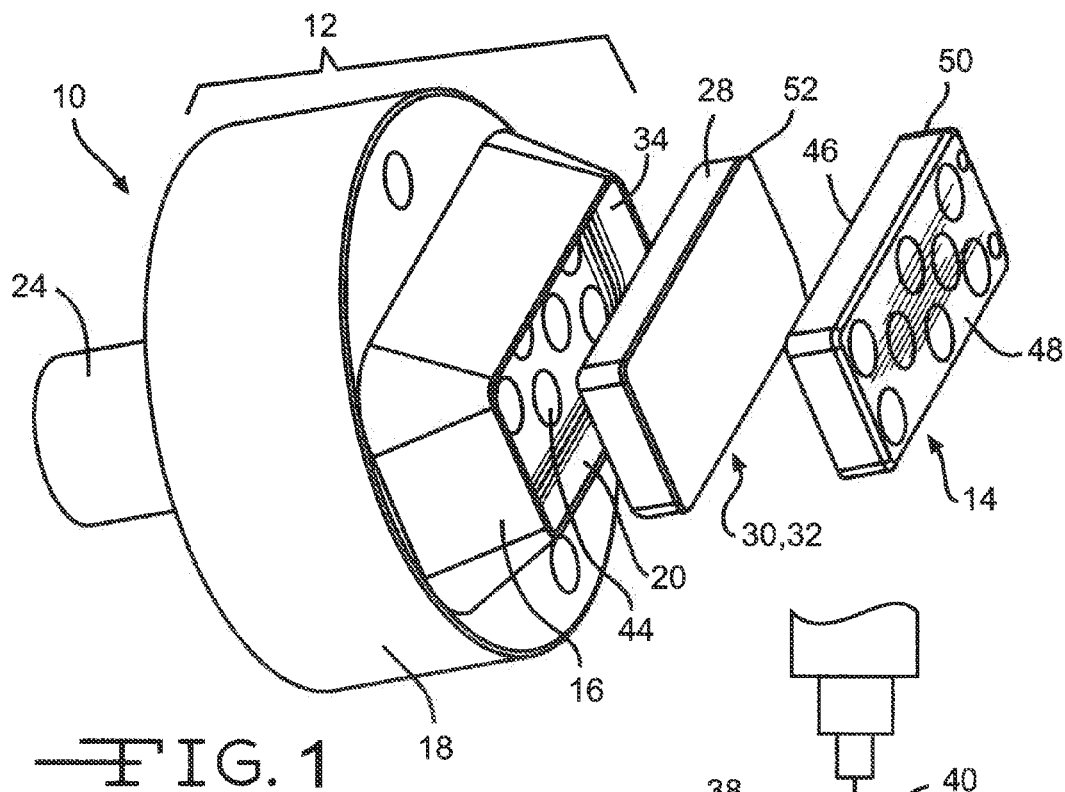
FIG. 1 illustrates a perspective view of an embodiment of the welding fixture of the present invention.
Figure 1A:
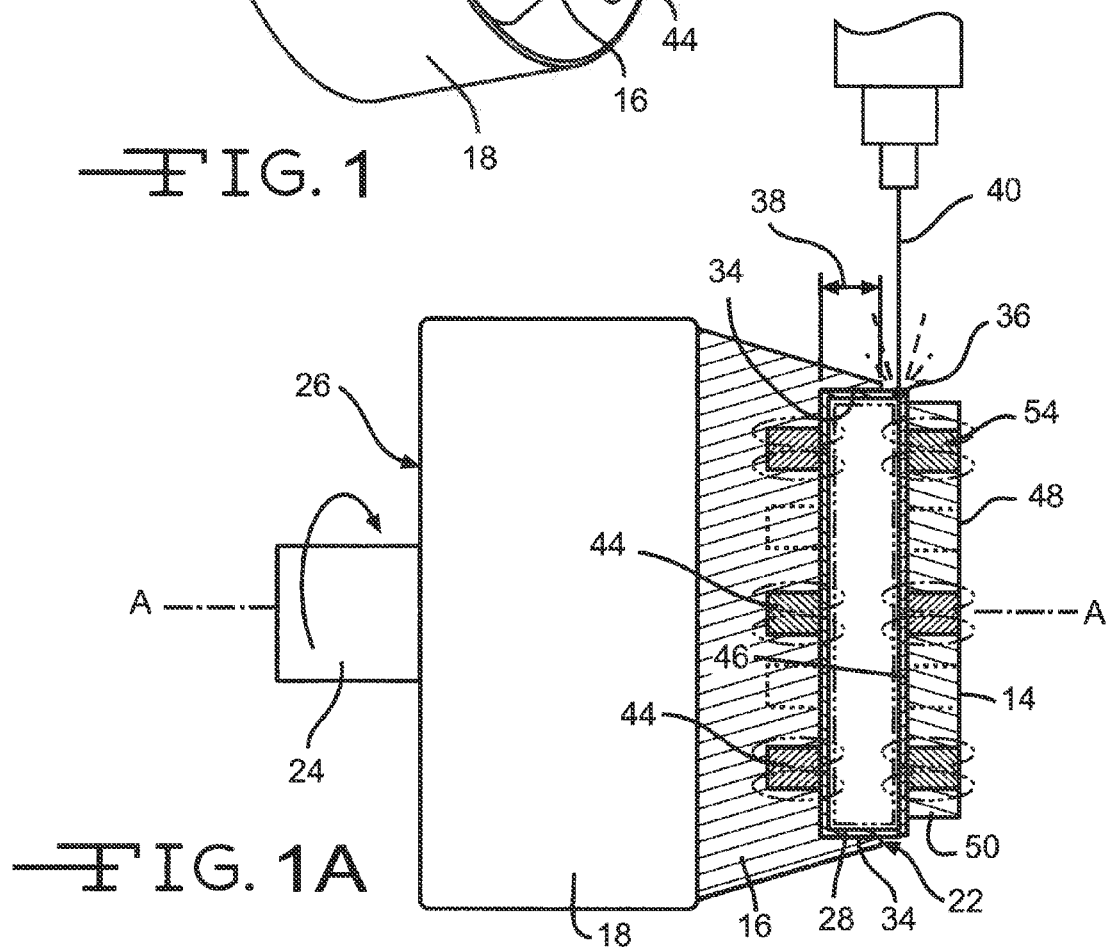
FIG. 1A illustrates a cross-sectional view of the welding fixture shown in FIG. 1.

Now turning to the figures, FIGS. 1, 1A, 2-2B, 3, 3A and 4-4C illustrate embodiments of a joining fixture 10 of the present invention. FIG. 1 illustrates a preferred embodiment of the joining fixture 10 comprising a fixture body portion 12 and a removable fixture plate portion 14. The fixture body portion 12 preferably comprises a fixture upper portion 16 that extends from a base portion 18 of the fixture 10. A fixture cavity portion 20 is provided within the upper portion 16 of the body 12. As shown, the cavity portion 20 may be formed within an exterior surface 22 of the upper portion 16 of the body 12 of the fixture 10.

A shaft 24 may also be provided. As illustrated, the shaft 24 preferably extends from a bottom surface 26 of the base portion 18. The shaft 24 is designed to provide a means of attachment of the fixture 10 to the welding instrument and allows for the fixture 10 to rotate with respect to the joining instrument. The shaft 24 extends about parallel to longitudinal axis A-A from the base portion 18.

As shown in FIG. 1, the fixture 10 comprises a uniform fixture body construction in which the upper portion 16 of the body 12 fluidly extends from the base portion 18. The cavity portion 20 is formed within the exterior surface of the fixture body portion 12. By way of example, the fixture cavity portion 20 is designed to receive a first housing portion 28. More specifically, the fixture cavity portion 20 is designed to receive the first housing or casing portion 28 of an electrochemical device 30 or medical device 32 during the joining process. It is noted that although the fixture of the present invention is preferably designed to hold two portions of a housing enclosure, it is contemplated that the fixture may hold two portions of a plurality of non-limiting assemblies and subassemblies that are intended to be joined.

In a preferred embodiment, the fixture cavity 20 has a plurality of cavity walls 34 that are recessed within the exterior surface 22 of the upper portion 16 of the fixture 10. The walls 34 of the cavity portion 20 are positioned such that they surround the perimeter of the first housing portion. 28 such that the housing portion 28 is held in place. Alternatively, the fixture cavity 20 may be formed such that the cavity walls 34 extend above the exterior surface 22 of the upper portion 16 of the body 12 of the fixture 10.

In a preferred embodiment, the walls of cavity portion 20 are designed such that they do not obstruct the line of sight of the welding instrument to an intended weld location 36. As shown in FIGS. 1A, 4, 4A, 4B, and 4C, the walls 34 of the cavity portion 20 are of a wall height 38 that sufficiently holds the housing portion 28 in place but does not block the line of sight to the weld location 36. In a preferred embodiment, the wall height 38 of the cavity 20 is less than the height of the first container or housing portion 28 that is received within the cavity 20. As illustrated, a laser beam 40 is not obstructed by the cavity walls 34 or the fixture plate 14. The laser beam 40 creates a weld seam 42 that preferably resides circumferentially around the housing of the electrochemical or medical device 30, 32.

As defined herein, the term "electrochemical device" refers to a device within which a chemical reaction generates electrical energy. Electrochemical devices may comprise rechargeable or non-rechargeable electrochemical cells or batteries such as lithium iodine cells, lithium carbon fluoride cells or silver vanadium oxide cells. Non-limiting example of electrochemical cells are disclosed in U.S. Pat. No. 7,611,805 to Frustaci et al. and U.S. Pat. No. 6,623,887 to Gan et al., both of which are incorporated by reference and assigned to the assignee of the present invention. An electrochemical device may also comprise electrochemical capacitors such as a wet tantalum capacitor, examples of which are disclosed in U.S. Pat. No. 7,813,107 to Druding et al. and U.S. Pat. No. 5,926,362 to Muffoletto et al., both of which are incorporated by reference and assigned to the assignee of the present invention.

Furthermore, the term "medical device" is defined herein as a device that provides therapeutic stimulation. Examples of medical devices include, but are not limited to, cardiac pacemakers, neurostimulators, defibrillators, and the like. A "magnet" is defined herein as a body of material having the property of producing a magnetic field external to itself. A "magetizable material" is a material that is capable of producing a magnetic field external to itself. An "electro-magnet" is defined herein as a body of magnetic material surrounded by a coil of wire through which an electric current is passed to magnetize the body.

As shown in FIGS. 1, 1A, 3, and 3A, a plurality of magnets 44 resides within the body portion 12 of the fixture 10. More specifically, the plurality of magnets resides within the upper portion 16 of the body 12 of the fixture 10. In a preferred embodiment, the plurality of magnets 44 are positioned about parallel to longitudinal axis A-A such that their respective magnetic north and south poles are aligned adjacent to each other. The magnets are preferably of a columnar shape as shown, or alternatively, may be constructed of a rectangular, square, round, oval, triangular or similar shape. Alternatively, a single magnetic of sufficient magnetic strength may be positioned within the thickness of the upper or base portions 16, 18 of the fixture 10. Furthermore, it is contemplated that either or both of the upper portion 16 or the base portion 18 of the body 12 may be constructed of a magnetic or magnetizable material.

As shown in FIGS. 1, 1A, 2, and 2A, the fixture plate 14 is positioned adjacent the fixture cavity portion 20. The fixture plate 14 is a separate component and is not permanently attached to the fixture 10. In a preferred embodiment, the fixture plate 14 comprises a first fixture plate sidewall 46 spaced from a second fixture plate sidewall 48. A fixture plate thickness 50 resides therebetween. The fixture plate 14 is dimensioned such that either the first or second fixture plate sidewalls 46, 48 covers at least a portion of the opening of cavity portion 20 of the fixture body 12.

In a preferred embodiment, the fixture plate 14 is designed such that the exterior surface of either the first or second sidewalls 46, 48 may contact an outer surface of a second housing portion 52 that is intended to be welded to the first housing portion 28. The second housing portion. 52 may comprise an opposing housing portion such as a case half or lid of the electrochemical or medical device 30, 32. The fixture plate 14 is designed to contact the outer surface of the second housing portion 52 such that the plate 14 portion combined with the cavity portion 20 hold the first and second housing portions 28, 52 together during the welding operation.

Figure 2:
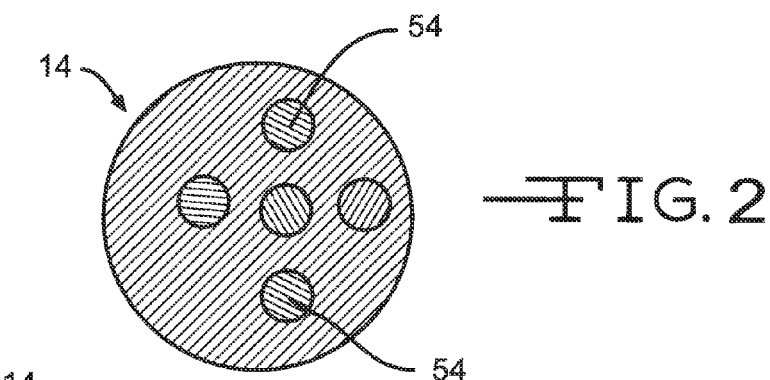
Figure 2A:
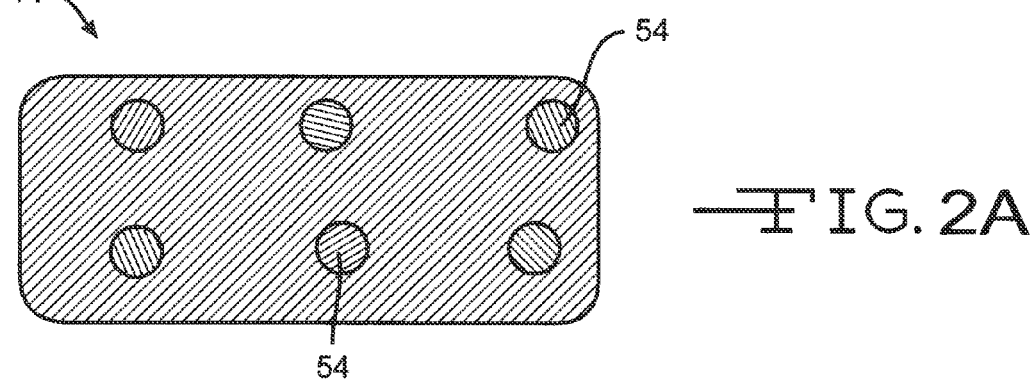
Figure 2B:
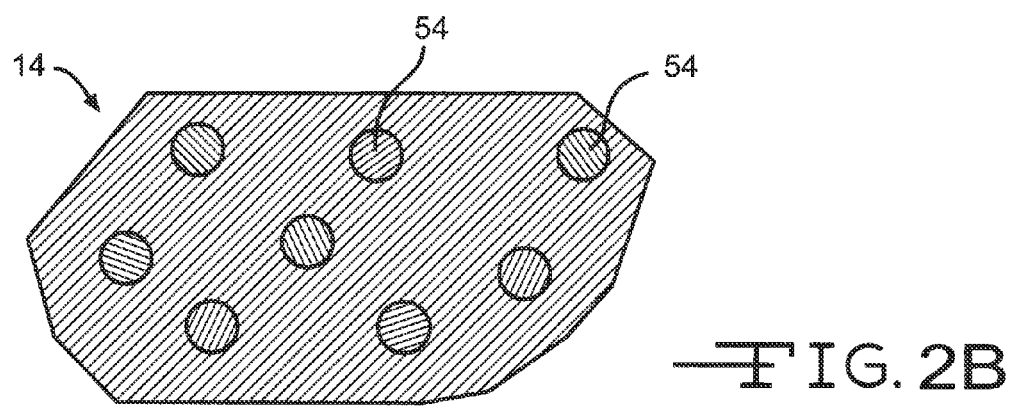

The shape of the fixture plate 14 may be designed to conform to the general shape of the cross-section of the second housing portion 52. FIGS. 2-2B illustrate non-limiting examples of the different cross-sectional shapes the fixture plate 14 may comprise. For example, the fixture plate 14 may comprise a generally round cross-section as shown in FIG. 2, a generally rectangular cross-section as shown in FIG. 2A, or the cross-section may be of a multi-sided polygon shape as shown in FIG. 2B.

In a preferred embodiment, a plurality of fixture plate magnets 54, comprising at least two magnets, resides within the thickness of the fixture plate 14. Similarly to the magnets residing within the body portion 44 of the fixture 10, the plurality of fixture plate magnets 54 are arranged in an orientation such that their magnetic north and south poles are positioned about parallel to longitudinal axis A-A. In addition, the plurality of plate magnets 54 is positioned such that the respective magnetic north and south poles are adjacent to each other. Alternatively, a single magnet 54 of sufficient magnetic strength may be positioned within the thickness of the fixture plate 14. Additionally, the fixture plate 14 may be constructed from a magnetic or magnetizable material.

Furthermore, the plate magnets 54 are preferably positioned within the thickness of the fixture plate 14 such that the magnetic poles of the plate and fixture body magnets 54, 44 oppose each other, thereby establishing an attractive magnetic force therebetween. In this preferred orientation, when the fixture plate 14 is positioned near the fixture cavity 20, a magnetic attraction force, ranging from about 0.5 lb to about 150 lbs, is established between the two sets of opposing magnets 44, 54. More preferably, a magnetic attraction force of less than 20 lbs is established between the two sets of opposing magnets 44, 54.

The magnetic attraction force between the opposing plurality of magnets 44, 54 is of a sufficient strength such that when the first and second housing portions 28, 52 are positioned between them, the housing portions 28, 52 do not adversely affect the strength of their magnetic attraction between the two opposing sets of magnets 44, 54. In other words, the force of magnetic attraction between the opposing fixture cavity 20 and the fixture plate 14 created by the opposing set of magnets 44, 54 is not adversely affected when the housing portions 28, 52 of the electrochemical device 30, or medical device 32 are positioned therebetween.

Because the magnetic attraction is created by the opposing magnets 44, 54, it is not necessary for the housing or enclosure portions 28, 52 to be constructed from magnetic materials. In a preferred embodiment, the first and second housing portions 28, 52 may be constructed from such non-limiting materials as titanium, stainless steel, aluminum, MP35N, copper, silver, gold, platinum, palladium, associated alloys, or the like.

Figure 3:
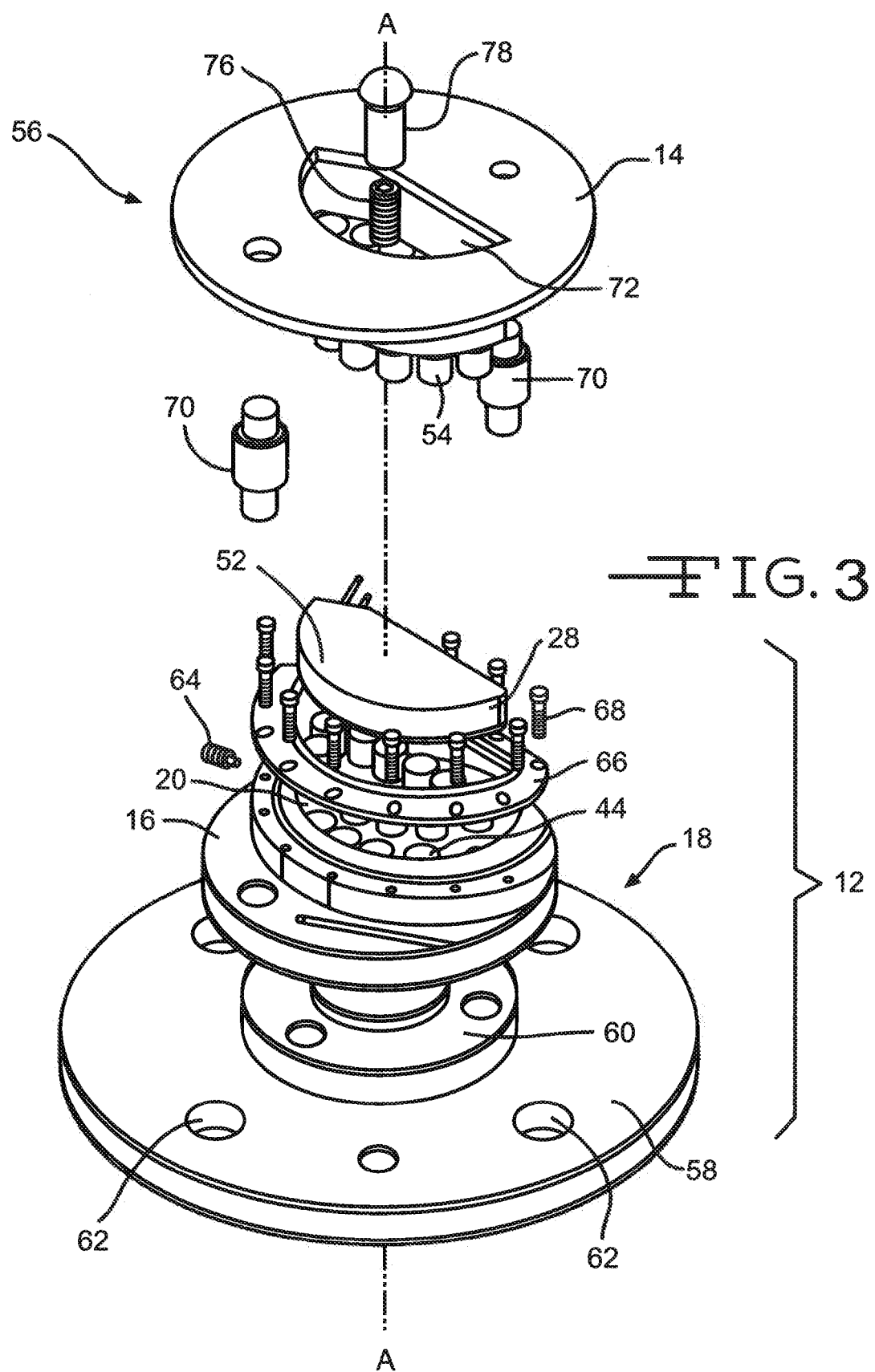

FIGS. 3 and 3A illustrate an alternate embodiment of a welding fixture 56 of the present invention. As shown, the base portion 18 of the fixture 56 further comprises a fixture base plate 58 and base plate pedestal 60 which extends from the top surface of the base plate 58. A series of base plate holes 62 may extend through the thickness of the base plate 58.

These base plate holes 62 provide a means of fastening the plate 58 to the welding instrument (not shown).

The upper body portion 16 is affixed to the base plate 58 opposite the base plate pedestal 60. Formed within the upper fixture body portion 16 is the fixture cavity portion 20, within which the first housing portion 28 is positioned. A setscrew 64, or the like, is provided to secure the upper fixture portion 16 to the base plate 58. Unlike the embodiment of the fixture illustrated in FIGS. 1 and 1A, the body portion 12 of the alternate embodiment shown in FIGS. 3 and 3A does not have a single body construction, but rather has a fixture body portion 12 comprised of separate base and upper portions 18, 16. The base and upper portions 18, 16 are connected together with the use of a fastener such as a screw, bolt, pin or the like.

A gasket 66 (FIGS. 3 and 3A) may be positioned about the perimeter of the cavity portion 20. A series of gasket screws 68 or the like is provided to secure the gasket 66 to the perimeter of the fixture cavity 20. The gasket 66 is provided to improve the fit up of the fixture plate 14 to the fixture cavity 20. Alignment, pins 70, as shown, may also be provided. These alignment pins 70 are utilized to ensure that the plate magnet(s) 54 are correctly aligned with the opposing fixture body magnet(s) 44.

Similar to the previous embodiment, a plurality of magnets 44 are provided within the body portion 12 of the fixture. Like the previous embodiment shown in FIGS. 1 and 1A, the plurality of body magnets 44 are positioned within the upper body portion 12 of the fixture 56, and are aligned such that they are about parallel to longitudinal axis A-A. These body magnets 44 are further positioned such that their respective magnetic poles are adjacent each other. However, a single magnet of sufficient magnetic strength may be positioned within the body portion 12.

An alternate embodiment of a fixture plate 14 is shown in FIG. 3. In this embodiment, the fixture plate 14 comprises a fixture plate opening 72 within which at least one plate magnet 54 resides. In a preferred embodiment, a plurality of plate magnets 54 is positioned within a magnet fixture 74. The magnet fixture 74 comprising the plurality of plate magnets 54, is positioned within the plate opening 72. A magnet fixture setscrew 76 and fixture plate knob 78 are provided to hold the magnet fixture 74 within the fixture plate 14.

In a preferred embodiment, the magnet fixture 74 may be composed of a material which is highly conductive of heat. Examples of such highly heat conductive materials include, but are not limited to, metals such as copper and aluminum as well as ceramic materials such a boron nitride, aluminum nitride, zirconium and yttrium stabilized zirconium. The highly heat conductive material acts as a heat sink that is designed to transfer heat away from the localized source of heat at the weld seam.

In a preferred embodiment, the heat sink is positioned adjacent to the internal components of the electrochemical device or medical device. More specifically, the heat sink may be positioned such that it contacts the external surface of the second housing portion 52. In this preferred embodiment, the concentration of the heat is diverted away from the device, thus reducing the likelihood that damage may result from the high intensity of the heat from the welding process. It is contemplated that the magnet plate fixture 74 does not necessarily compose the heat sink.

Alternatively, a portion of highly heat conductive material, such as a sheet or plate, may be positioned between the fixture plate 14 and the housing portions 28, 52. In addition, it is contemplated that the fixture plate 14 may be entirely composed of a material that is conductive of heat and, therefore, acts as a heat sink. Furthermore, it is contemplated that the fixture body portion 12 may be composed of a material that is conductive of heat to act as an additional heat sink.

FIGS. 4, 4A, 40, and 4D illustrate alternate embodiments of a welding fixture 80 of the present invention. Similar to the previous welding fixtures 10, 56, the alternate welding fixture 80 comprises a fixture body portion 12, a fixture plate 14, and a fixture shaft 24. The fixture body portion 12 further comprises a fixture base portion 18 and a fixture upper portion 16. As shown, a fixture cavity portion 20 is formed within the fixture body portion 12. Specifically, the fixture cavity portion is formed within the top surface of the upper body portion 16. However, the alternate embodiment of the welding fixture 80 comprises an electro-magnet(s) in lieu of the plurality of fixture body and plate magnet(s) 44, 54.

Figure 4:
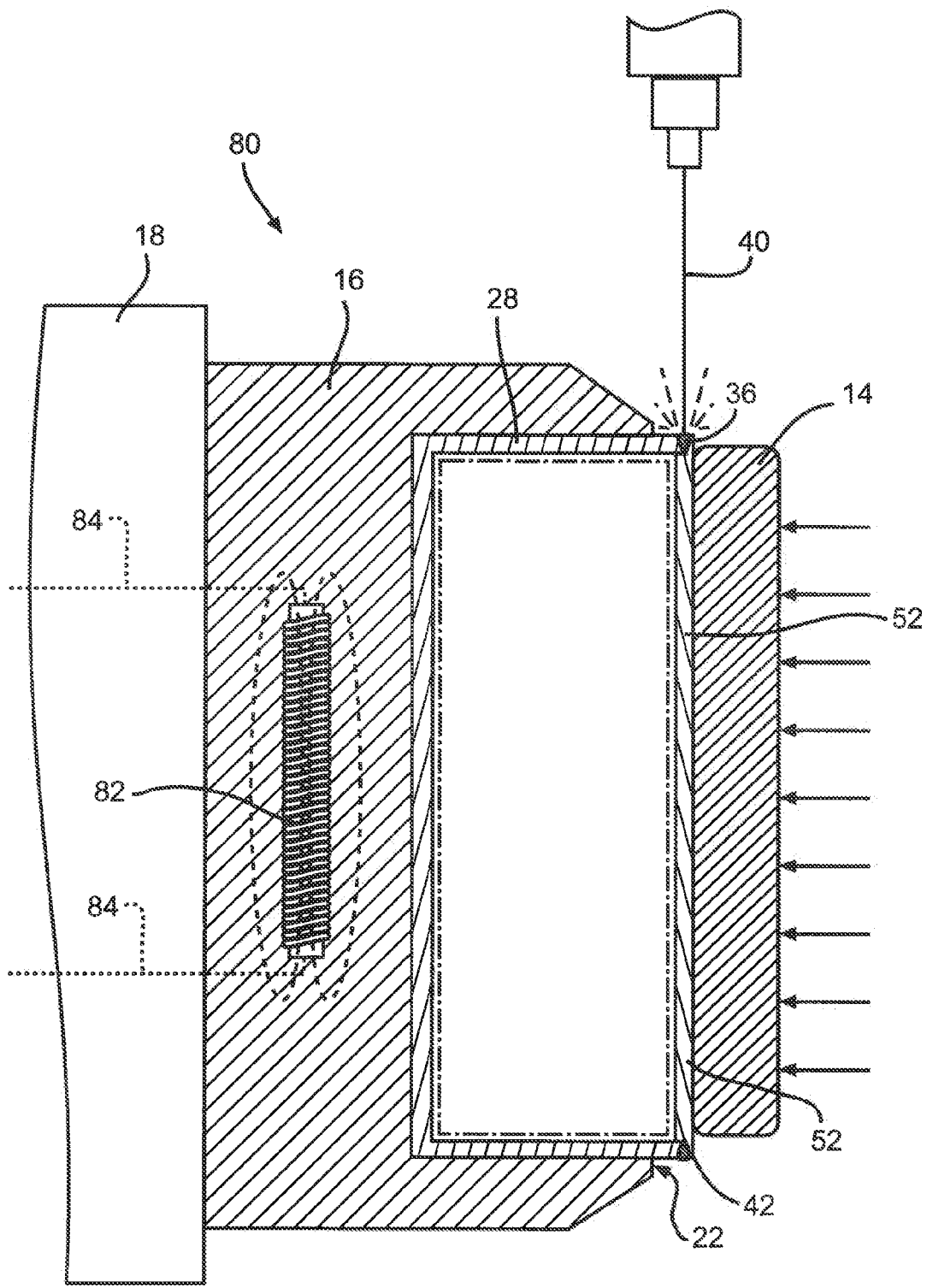
Figure 4A:
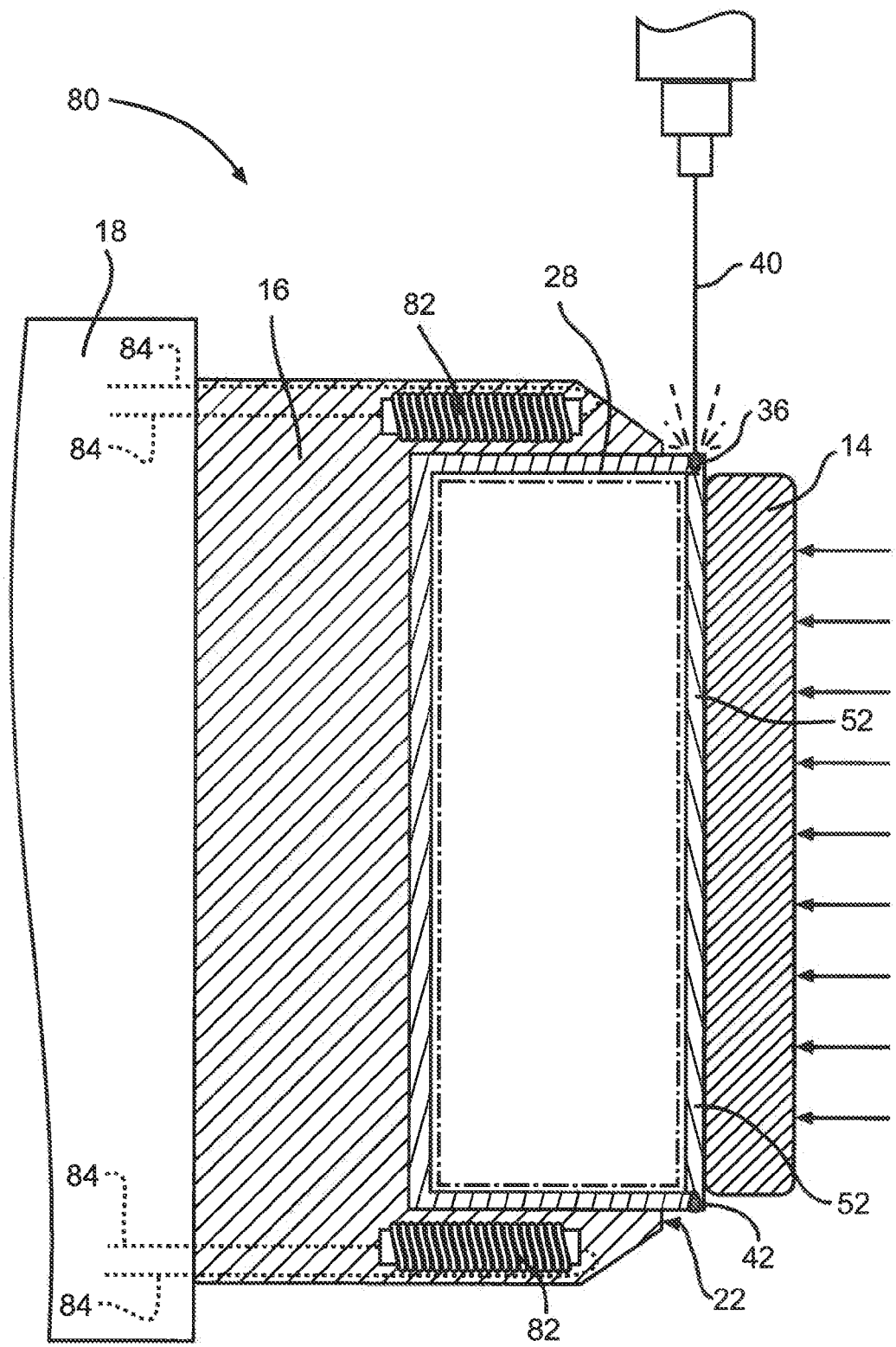

As illustrated in FIGS. 4 and 4A, at least one body electro-magnet 82 is positioned within the thickness of the body portion 12 of the fixture 80. Specifically, as shown in FIG. 4, the body electro-magnet 82 is positioned within the thickness of the fixture body portion 12 behind or beneath a bottom surface of the fixture cavity portion 20. Conductors 84 connected between the terminal ends of the electro-magnet 82 and an energy source (not shown) provide electrical power to generate the magnetic field. In this embodiment, the fixture plate 14 is preferably comprised of a magnetic material such as a ferrous metal. The magnetic field generated by the electro-magnet physically attracts the fixture plate 14 closer towards the cavity portion 20 of the fixture 80, thus compressing the housing portions 28, 52 together. It is contemplated that electro-magnet 82 may be positioned in a number of non-limiting orientations within the body portion 12.

As shown in FIG. 4A, two electro-magnets 82 may be positioned about parallel to longitudinal axis A-A, adjacent and behind the walls of the cavity portion 20. When energized, the electro-magnets generate a magnetic field that pulls the fixture plate 14 closer towards the opening of the fixture cavity portion 20. In this embodiment, the fixture plate 14 may be made from a ferrous magnetic material.

Figure 4B:
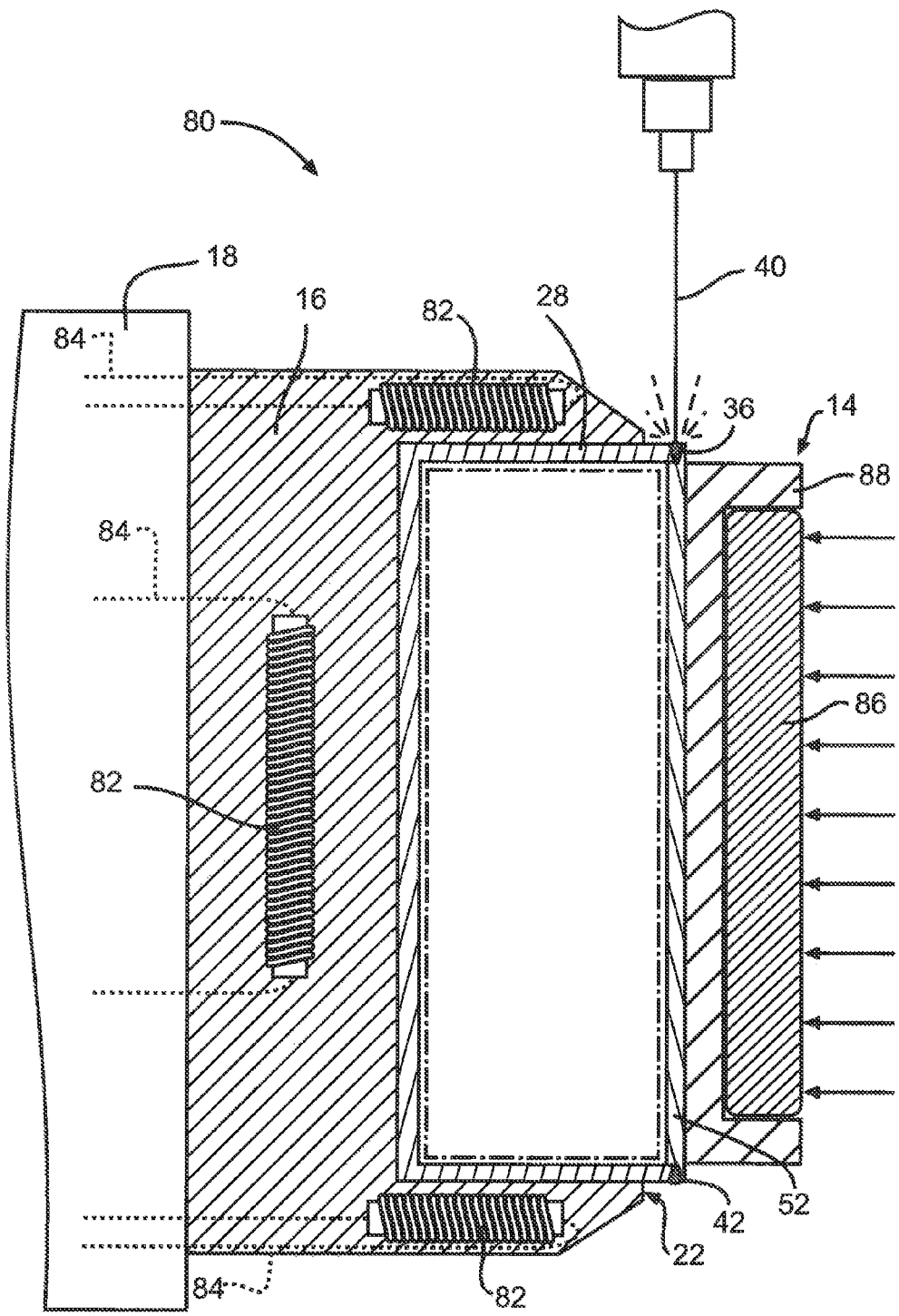
Figure 4C:
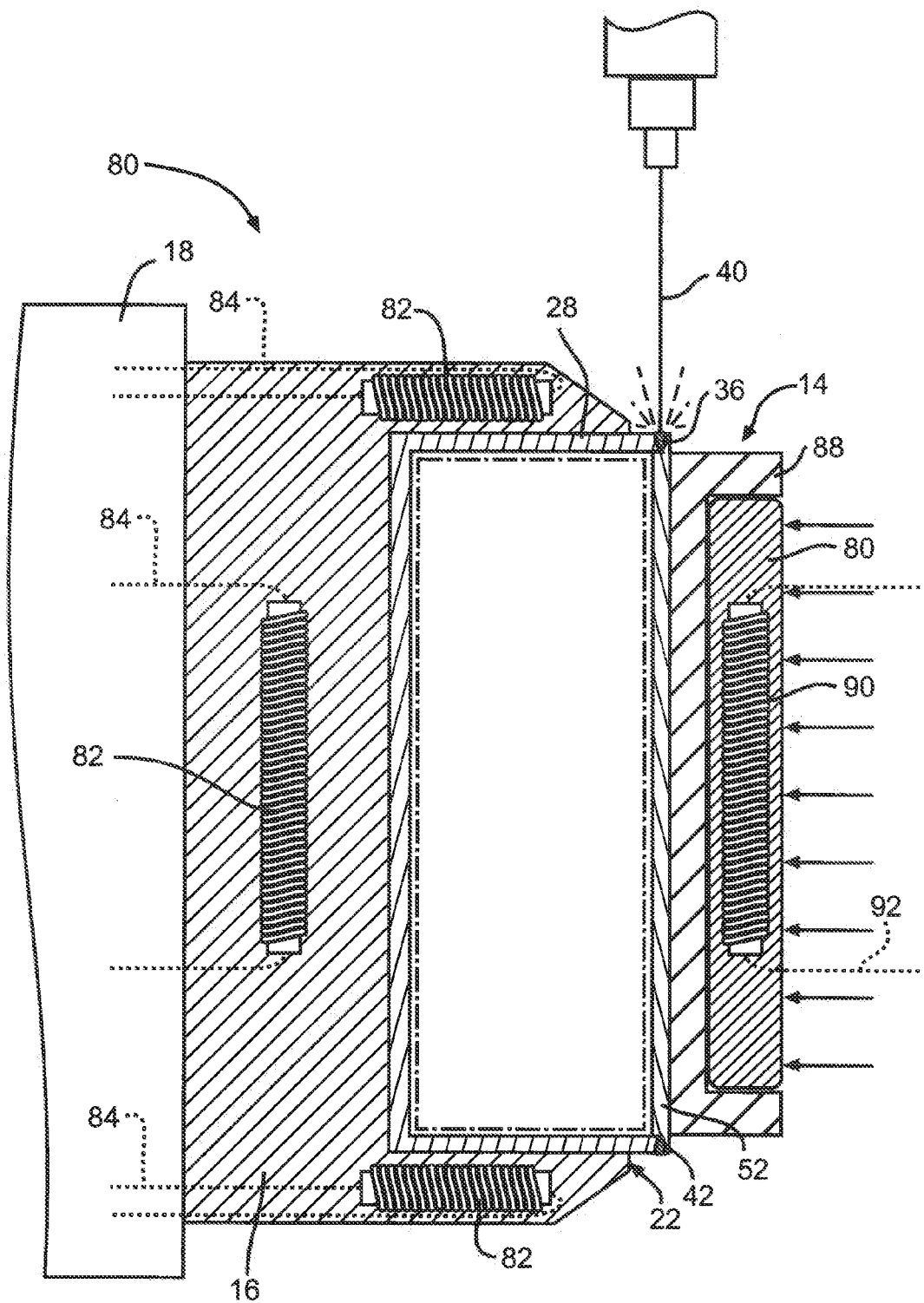

FIG. 4B illustrates an alternate embodiment of the fixture 80 of the present invention in which the fixture plate 14 comprises a magnetic insert 86 positioned within a fixture insert holder 88. In a preferred embodiment, the fixture plate insert 86 is preferably composed of a magnetic ferrous material. This material is designed to be magnetically attracted to the electro-magnet 82, thus pulling the plate portion 14 closer to the opening of the cavity portion 20. The fixture plate holder portion 88 may be composed of a metallic or ceramic material that is not necessarily of a magnetic material. For example, the fixture plate holder portion 88 may be composed of titanium, MP35N or stainless steel. It is contemplated that the fixture plate 14 of the previous fixture embodiments 10, 56 may also comprise a fixture plate comprised of a magnetic material.

Alternatively, the fixture plate holder portion 88 may be composed of a material with relatively high heat conductivity, such as a thermally conductive metal or ceramic. Examples of such materials include, but are not limited to, copper, boron nitride, aluminum nitride or zirconia. These high heat conductive materials act as heat sinks which divert heat away from the weld location 36.

FIG. 40 illustrates yet another alternative embodiment of the present invention in which the fixture plate portion 14 comprises a fixture plate electro-magnet 90. In this embodiment, the fixture plate electro-magnet 90 is positioned within the thickness of the fixture plate insert 86. Conductors 92 connect the terminals of the electro-magnet to the power source (not shown). In this embodiment, the fixture plate insert 86 and fixture plate insert holder 88 do not necessarily need to be made from a magnetic material. In this case, since the electro-magnet is positioned within the fixture plate insert 86, the attractive magnetic field is generated from within the fixture plate 14.

Although it is preferred that a plurality of electro-magnets are positioned within the fixture cavity and fixture plate portions 20, 14, as illustrated in FIGS. 4, 4A, 4B and 40, it is contemplated that magnets may be substituted for the electro-magnets. Furthermore, a combination of a single or a plurality of magnets and a single or plurality of electro-magnets may also be used within the cavity and plate portions 20, 14 of the fixture 80.

In operation, the base portion 18 of the fixture 10, 56 is first attached to a rotary arm (not shown) of the welding instrument. Once attached, the first housing portion 28 is positioned within the cavity portion 20 of the body portion 12 of the fixture 10, 56. Alternatively, the plurality of electro-magnets 82, 90 is first energized and the first housing portion 28 is positioned within the cavity 20 of the fixture.

After the first housing portion is positioned within the fixture cavity 20, the second housing portion 52 is fitted to the first housing portion. As previously mentioned, the two housing portions 28, 52 may comprise two opposing case or enclosure halves as well as a case half and corresponding lid portion. Once the housing portions 28, 52 are fitted together, the fixture plate portion 14 is then positioned in contact with the exterior surface of the second housing portion 52. The attractive magnetic field created between the fixture body and plate portions 12, 14 holds the housing components together. It is noted that the plate fixture portion 14 is positioned such that the plate portion does not obstruct the line of sight of the weld beam 40 or other joining contact.

Once the fixture plate portion 14 is aligned with the housing portions 28, 52 and fixture cavity portion 20, the housing components 28, 52 are joined together. In a preferred embodiment, the laser weld instrument is preferably used to weld the housing portions 28, 52 together. Various welded seam configurations for electrochemical devices, described and shown in U.S. Pat. No. 6,613,474 to Frustaci et al., which is assigned to the assignee of the present invention and incorporated herein by reference, may be used with the fixture of the present invention.

Although the fixtures 10, 56, 80 of the present invention are preferably intended for use during a laser welding operation, they may also be used to hold components during a number of non-limiting joining techniques. For example, any one of the fixtures 10, 56, 80 may be used to hold components together during resistance welding, ultrasonic welding, arc welding, soldering, or the like.

In a preferred embodiment, the weld fixtures 10, 56, 80 are rotated either clockwise or counterclockwise with respect to the laser weld beam 40. The fixture may rotate around a stationary laser beam or alternatively, the laser beam 40 may rotate around the fixture. In either case, after the welding operation is performed and the components 28, 52 are joined together, the fixture plate 14 is pulled distally away from the fixture cavity portion 20, thereby releasing the welded components from within the fixture cavity.

Accordingly, the invention is not limited, except by the appended claims.

What is claimed is:
1. A fixture, comprising:
  a) a fixture body comprising a body sidewall having a height extending from a body base wall to an open upper end, wherein the body sidewall is spaced from a longitudinal, axis to thereby define an open body cavity positioned along the longitudinal, axis;
  b) at least one body magnet having opposing north and south magnetic poles, the body magnet positioned within the fixture body base wall beneath an outer surface thereof and aligned with the body cavity;
  c) a fixture plate having a fixture plate thickness defined by a first fixture plate sidewall spaced from a second fixture plate sidewall;
  d) a plate magnet having opposing north and south plate magnetic poles positioned within the fixture plate thickness; and
  e) wherein the fixture plate is positionable adjacent to the open body cavity of the fixture body with the magnetic poles of the body magnet being aligned opposite the magnetic poles of the plate magnet such that a magnetic attraction force is created which draws the fixture plate toward the body cavity.

2. The fixture of claim 1 wherein the body cavity is sized to receive a first portion of a container therein and supported on the body base wall with the body sidewall having a lesser height along, but spaced from, the longitudinal axis than the first container portion adjacent to the body sidewall.

3. The fixture of claim 1 wherein the body magnet is positioned such that the body magnet's north and south magnetic poles reside about parallel to the longitudinal axis.

4. The fixture of claim 1 wherein a heat sink resides within at least one of the fixture plate thickness, the body base wall, and the body sidewall.

5. The fixture of claim 4 wherein at least one of the heat sink, the fixture body, and the fixture plate comprises a thermally conductive material.

6. The fixture of claim 1 wherein at least one of the body magnet and the plate magnet is an energizable electro-magnet, wherein upon energization of the electro-magnet, a magnetic attraction force is created which draws the fixture plate toward the body cavity.

7. The fixture of claim 1 wherein a shaft extends longitudinally from a bottom surface of the fixture body opposite the body cavity.

8. The fixture of claim 1 wherein the body magnet and the plate magnet are configured to provide the magnetic attraction force ranging from about 0.5 lbs. to about 150 lbs.

9. The fixture of claim 1 wherein a first surface area of the base wall perpendicular to the longitudinal axis is greater than a second surface area of the first fixture plate sidewall facing the base wall.

10. The fixture of claim 1 wherein a first diameter of the open upper end of the fixture body is greater than a second diameter of the fixture plate as measured perpendicular to the thickness.

11. A fixture, comprising:
  a) a fixture body comprising a body sidewall having a height extending from a body base wall to an open upper end, wherein the body sidewall is spaced from a longitudinal axis to thereby define an open body cavity positioned along the longitudinal axis;
  b) a fixture plate having a fixture plate thickness defined by a first fixture plate sidewall spaced from a second fixture plate sidewall;
  c) wherein one of the fixture body and the fixture plate has a magnet positioned within the body base wall or the fixture plate, as the case may be, and beneath an outer surface thereof and wherein the other of the fixture plate and the fixture body, either of the fixture sidewall or the fixture base wall is composed of a magnetizable material, and
  d) wherein the fixture plate is positionable adjacent to the open body cavity of the fixture body such that a magnetic attraction force is created between the magnet in the one of the fixture body and the fixture plate and the other of the magnetizable material which draws the fixture plate toward the body cavity.

12. The fixture of claim 11 wherein the body cavity is sized to receive a first portion of a container therein and supported on the body base wall with the body sidewall having a lesser height along, but spaced from, the longitudinal axis than the first container portion adjacent to the body sidewall.

13. The fixture of claim 11 wherein a first surface area of the base wall perpendicular to the longitudinal axis is greater than a second surface area of the first fixture plate sidewall facing the base wall.

14. The fixture of claim 11 wherein the magnet is an energizable electro-magnet, wherein upon energization of the electro-magnet, a magnetic attraction force is created which draws the fixture plate toward the body cavity.

15. The fixture of claim 11 wherein a heat sink resides within at least one of the fixture plate thickness, the body base wall, and the body sidewall.

16. The fixture of claim 15 wherein at least one of the heat sink, the fixture body and the fixture plate comprises a thermally conductive material.

17. The fixture of claim 11 wherein a first diameter of the open upper end of the fixture body is greater than a second diameter of the fixture plate as measured perpendicular to the thickness.

18. A method for joining two opposing first and second portions of a container, the method comprising the steps:
  a) providing a fixture, comprising:
    i) a fixture body comprising a body sidewall having a height extending from a body base wall to an open upper end, wherein the body sidewall is spaced from a longitudinal axis to thereby define an open body cavity positioned along the longitudinal axis;
    ii) at least one body magnet having opposing north and south body magnetic poles, the body magnet positioned within the fixture body base wall beneath an outer surface thereof and aligned with the body cavity;
    iii) a fixture plate having a fixture plate thickness defined by a first fixture plate sidewall spaced from a second fixture plate sidewall; and
    iv) a plate magnet having opposing north and south plate magnetic poles positioned within the fixture plate thickness; and
  b) placing a first portion of a container having an open container end within the body cavity;
  c) positioning a second container portion in a contact relationship with the first container portion to thereby close the open container end; and
  d) placing the first or the second sidewall of the fixture plate adjacent to an exterior surface of the second container portion contacting the first container portion with the fixture and body magnets aligned so that the container portions are in position to be joined to each other.

19. The method of claim 18 further joining the first and second container portions together.

20. The method of claim 18 further joining the first and second portions with one of the group consisting of a laser weld, a resistance weld, a solder joint, an ultrasonic weld, and an arc weld.

21. The method of claim 18 further providing the first and second container portions comprising a material selected from the group consisting of stainless steel, aluminum, titanium, MP35N, copper, silver, gold, platinum, palladium, associated alloys, and combinations thereof.

22. The method of claim 18 further providing the first and second container portions of an electrochemical device or a medical device.

23. The method of claim 18 further positioning the body magnet such that the body magnet's north and south magnetic poles reside about parallel to the longitudinal axis.

24. The method of claim 18 including providing a first surface area of the base wall perpendicular to the longitudinal axis being greater than a second surface area of the first fixture plate sidewall facing the base wall.

25. The method of claim 18 including providing a height of a wall of the cavity that is less than a height of the first container portion.

26. The method of claim 18 including providing the open end of the fixture body having a first diameter of the opening that is greater than a second diameter of the fixture plate as measured perpendicular to the thickness.

27. A fixture, comprising:
  a) a fixture body having a cavity positioned along a longitudinal axis;
  b) at least one body magnet having opposing north and south magnetic poles, the body magnet positioned within the fixture body;
  c) a fixture plate having a first sidewall spaced from a second sidewall, a plate thickness therebetween, a plate opening extending through the plate thickness, and at least one plate magnet having opposing north and south plate magnetic poles positioned within the plate opening;
  d) a fixture base comprising a base plate and a plate pedestal extending from a top surface of the base plate, the fixture body adhered to the plate pedestal; and
  e) wherein the fixture plate is positionable adjacent to the cavity of the fixture body with the magnetic poles of the body magnet being aligned opposite the magnetic poles of the plate magnet such that a magnetic attraction force is created therebetween.

28. The fixture of claim 27 wherein a first surface area of the base wall perpendicular to the longitudinal axis is greater than a second surface area of the first fixture plate sidewall facing the base wall.

29. The fixture of claim 27 wherein the body cavity is sized to receive a first portion of a container therein and supported on the body base wall with the body sidewall having a lesser height along, but spaced from, the longitudinal axis than the first container portion adjacent to the body sidewall.

30. The fixture of claim 27 wherein a first diameter of the open upper end of the fixture body is greater than a second diameter of the fixture plate as measured perpendicular to the thickness.

31. A fixture, comprising:
  a) a fixture body comprising a body sidewall having a height extending from a body base wall to an open upper end, wherein the body sidewall is spaced from a longitudinal axis to thereby define an open body cavity positioned along the longitudinal axis;
  b) a fixture plate having a fixture plate thickness defined by a first fixture plate sidewall spaced from a second fixture plate sidewall, and wherein a first surface area of the body base wall perpendicular to the longitudinal axis is greater than a second surface area of the first fixture plate sidewall facing the base wall;
  c) wherein one of the fixture body and the fixture plate has a magnet positioned within the body base wall or the fixture plate, as the case may be, and beneath a outer surface thereof and wherein the other of the fixture body and the fixture plate is of a magnetizable material; and d) wherein the fixture plate is positionable adjacent to the open body cavity of the fixture body such that a magnetic attraction force is created between the magnet in the one of the fixture body and the fixture plate and the other of the magnetizable material which draws the fixture plate toward the body cavity.

32. The fixture of claim 31 wherein the magnet is an energizable electro-magnet, wherein upon energization of the electro-magnet, a magnetic attraction force is created which draws the fixture plate toward the body cavity.

33. The fixture of claim 31 wherein a heat sink resides within at least one of the fixture plate thickness, the body base wall, and the body sidewall.

34. The fixture of claim 33 wherein at least one of the heat sink, the fixture body and the fixture plate comprises a thermally conductive material.

35. The fixture of claim 31 wherein a first diameter of the open upper end of the fixture body is greater than a second diameter of the fixture plate as measured perpendicular to the thickness.

\* \* \* \* \*

UNITED STATES PATENT AND TRADEMARK OFFICE
CERTIFICATE OF CORRECTION

PATENT NO. : 9,061,400 B1  
APPLICATION NO. : 13/423355  
DATED : June 23, 2015  
INVENTOR(S) : Xiangyang Dai, Robert Miller and Gregory A. Voss Page 1 of 1

It is certified that error appears in the above-identified patent and that said Letters Patent is hereby corrected as shown below:

Claims

Column 9, line 66 (Claim 1, line 5) after the word "longitudinal" delete the ","

Signed and Sealed this
First Day of March, 2016

Michelle K. Lee
*Director of the United States Patent and Trademark Office*